United States Patent

Raley

[11] 3,911,187
[45] Oct. 7, 1975

[54] EMBOSSED PLASTIC FILM

[75] Inventor: Garland E. Raley, Terre Haute, Ind.

[73] Assignee: Ethyl Corporation, Richmond, Va.

[22] Filed: Dec. 26, 1973

[21] Appl. No.: 428,186

[52] U.S. Cl. ............... 428/180; 264/280; 264/284; 428/156; 428/179
[51] Int. Cl.² ................... B32B 1/00; B32B 3/30
[58] Field of Search .......... 161/116, 125, 130, 131, 161/134, 135; 264/280, 284, 286, 92; 156/196, 210

[56] References Cited
UNITED STATES PATENTS

| | | | |
|---|---|---|---|
| 1,160,316 | 11/1915 | Paterson | 161/131 |
| 2,446,771 | 8/1948 | Knowland | 264/284 |
| 2,776,452 | 1/1957 | Chavannes | 264/284 |
| 3,060,515 | 10/1962 | Corbett | 264/284 |
| 3,484,835 | 12/1969 | Trounstine et al. | 161/130 |
| 3,558,394 | 1/1971 | Marby | 156/210 |
| R23,910 | 12/1954 | Smith et al. | 264/92 |

Primary Examiner—George F. Lesmes
Assistant Examiner—Paul J. Thibodeau
Attorney, Agent, or Firm—Donald L. Johnson; John F. Sieberth; David L. Ray

[57] ABSTRACT

A thermoplastic film having a permanently embossed design which simulates woven fabric or cloth and which has edge-curl resistance under machine stress and low light reflectivity or gloss is disclosed. The embossed design is made up of latitudinally and longitudinally alternating hollow protuberances and depressions on both sides of the film.

2 Claims, 5 Drawing Figures

EMBOSSED PLASTIC FILM

BACKGROUND OF THE INVENTION

As is well-known, plastic films now are used for a great many purposes as a substitute for textiles, as in raincoats, baby diaper liners, shower curtains, drapes, etc. It is desirable, from an esthetic point of view, that these plastic films have a design on their surfaces which gives the film an appearance of a woven fabric or cloth. Generally this appearance is achieved by embossing the surface of the film with a pattern giving the desired effect.

One generally common pattern is one which consists of a pattern of protruding bosses in the plastic film which extend up from only one surface of the film surface. These bosses are formed in the film such that the sides of the designs form channels which may extend diagonally or perpendicularly to the edges of the sheet. This type pattern, though giving the appearance of woven cloth, is not particularly desirable as it has a tendency to edge-curl when pull or stress is applied to the film. This edge-curl presents problems in the manufacture of the film and in use of the film in the final product. Also, these type patterns result in high degree of gloss which detracts from the desired visual appearance of embossed film (see U.S. Pat. No. 3,484,835).

It is therefore an object of this invention to provide a thermoplastic film which is embossed with a pattern which produces low gloss and does not render the film susceptible to edge-curl.

THE INVENTION

This invention relates to an embossed length of thermoplastic film having a pattern of latitudinally and longitudinally alternating hollow protuberances and depressions on each side of said film wherein the sidewalls of adjacent protuberances and depressions are planarly connected and the opposite side of each hollow protuberance forms the depression on the film side opposite the protuberance.

As can be appreciated, the film of this invention has no channels which extend continuously over the surface of the film and thus light reflectivity or gloss is greatly reduced. Also, by not having such channels the edge-curl problem is greatly reduced. Also, the design described above results in a pattern which gives the embossed plastic film a taffeta-like finish having the same "hand" or feel to the touch on each side of the film because the embossed pattern is substantially identical on each side of the film.

In a preferred form, protuberances of the embossed thermoplastic film of this invention have a shape which may be generally described as that of a four-sided truncated pyramid. Since the hollow protuberances on one side of the film form depressions on the other side of the film it is clearly seen that the depressions will likewise have the form which outlines a four-sided truncated pyramid. Other shapes for the hollow protuberances and depressions are encompassed within the principles of this invention. For example, designs which are square, retangular, etc. are useful.

The embossed thermoplastic film of this invention is made from suitable material such as the polyolefin type—particularly polyethylene and polypropylene—copolymers of polyolefins such as ethylene-vinyl acetate copolymers; or modified polyolefin polymers such as polyethylene or polypropylene modified with conventional fillers and the like. The thickness of the film prior to embossing can vary over a wide range, i.e., from about 0.5 mil to about 10 mils. The particular thickness of the thermoplastic film is more dependent upon the ultimate utilization of the embossed plastic film than upon the unique configuration of this invention. Generally speaking, thermoplastic films having a thickness ranging from 0.5 mil to 2.0 mils are more widely used for wearing apparel and thus this thickness of film is more preferred when producing embossed film in accordance with this invention.

The embossing of the films of this invention can be achieved according to any of the well-known techniques. Basically the embossing can be performed in two ways, i.e., by the introduction of a pre-formed film into a system of embossing rolls or by the introduction of an extruded melt of plastic material through a slot-die between the embossing rolls. Both methods entail the using of a steel embossing roll and a somewhat resilient roll which form a nip for embossing the film. These techniques are conventional and are well-known to those skilled in the art. Once one skilled in the art knows the particulars of the pattern of this invention it is within his skill to achieve this pattern quite easily by the utilization of these conventional techniques.

The principles of this invention contributing satisfaction in use and economy will be more fully understood from the following description of a preferred embodiment of this invention when taken in connection with the accompanying drawings, wherein identical numerals refer to identical parts and in which FIG. 1 is a perspective view of a thermoplastic film of this invention showing the embossed configuration on both sides of the film;

Figure 1:
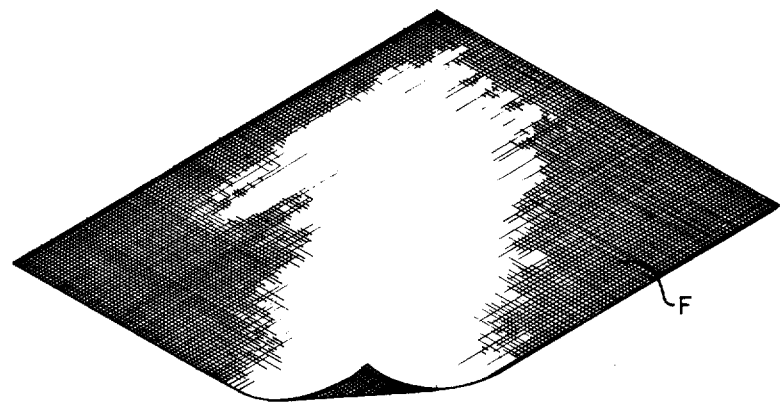
FIG. 1 depicts a length of thermoplastic film F having on each side thereof an embossed design in accordance with this invention. An enlarged section of the film F giving details of the embossing design is shown in FIG. 2.
Figure 2:
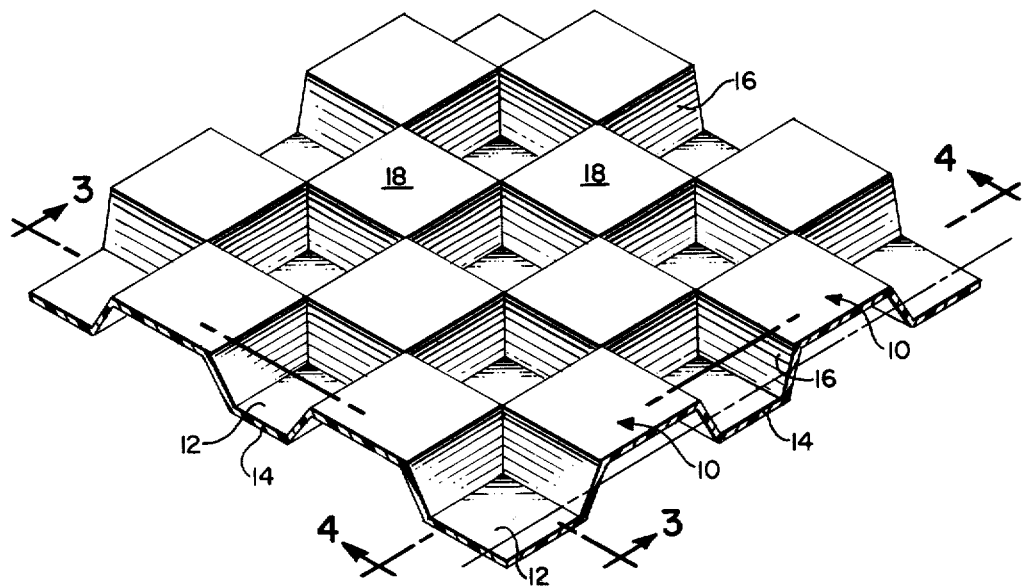
FIG. 2 is a magnified fragmentary perspective view of the film of FIG. 1.
Figure 3:
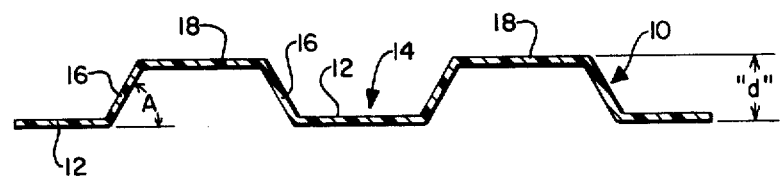
FIG. 3 is a sectional view taken along sectional lines 3—3 of FIG. 2.

As can be seen in FIG. 2 the protuberances 10 have the form of a four-sided truncated pyramid. The height of each protuberance 10 as measured from the top of a protuberance on one side of the film to the top of a protuberance on the other side of the film (shown as $d$ in FIG. 3) may vary from about 0.5 mil to about 10.0 mils. Heights less than 0.5 mil are permissible but are not particularly preferred as these heights do not generally give the proper texture or "hand" for films having thicknesses which are generally used as wearing apparel, etc. Generally, to more closely simulate the feel of cloth, heights of from about 1.5 mils to about 5.0 mils are preferred. Heights greater than 10.0 mils may be desirable when utilizing thermoplastic film having a thickness greater than the generally used films, i.e., a thickness greater than 10 mils. The angle A as seen in FIG. 3 formed by sidewall 16 of protuberance 10 and bottom wall 12 of depressions 14 is generally from about 45° to about 85°. A preferred angle will fall within the range of from about 60° to about 85°. The embossed film may have from about 20 to about 200 cells per square inch, half being protuberances and half being depressions. Thus the width of protuberances 10 at their base vary from about 5 mils to about 50 mils. For best appearance a preferred base width varies from about 5 mils to about 20 mils.

As can be seen from FIG. 2, depressions 14 are also formed in each side of the film and directly opposite to four adjacent protuberances 10. This is the result of the fact that walls of four adjacent hollow protuberances 10 form and define a depression 14.

Sidewalls 16 are planarly connected to the bottom walls 12 of depressions 14 and the top walls 18 of protuberances 10.

The depth of depressions 14 are measured from one side of the film to the other and are identical to the width $d$ of protuberances 10 as seen in FIG. 3.

Figure 4:
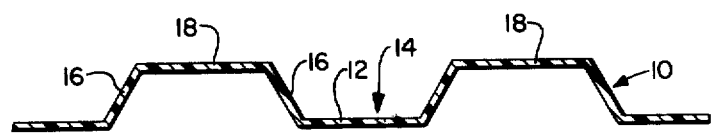
FIG. 4 is a sectional view taken along the sectional lines 4—4 of FIG. 2.

Referring now to FIGS. 3 and 4, it can be seen that a cross section of the embodiment of the embossed film shown in FIG. 2 resembles a series of truncated pyramids 10 which are connected at their bases by bottom wall 12. Thus the embossed films have the same pattern on each of the surfaces which provides a uniform "hand" of feel for each side of the embossed film.

In actual practice it is generally more difficult to achieve a configuration having the sharp neat lines as depicted in the drawings. More realistically the actually produced film will resemble that shown in the drawing but will have more or less round corners and less exact angles.

Figure 5:
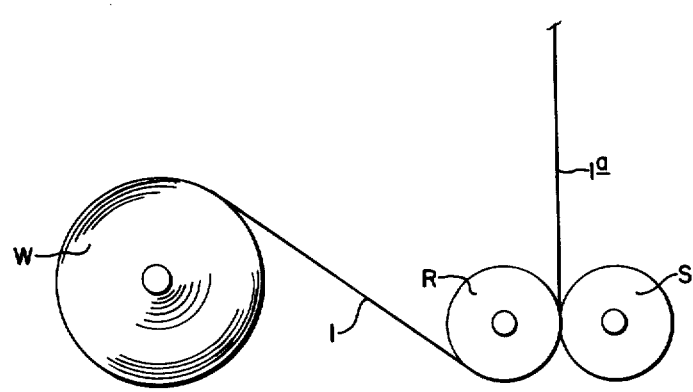
FIG. 5 is a diagramatic view and side elevational view of a system of embossing rolls together with a wind-up roll suitable for use in the present invention.

As before mentioned, the film of this invention can be produced by any conventional embossing method known to those skilled in the art. Exemplary of those systems is that shown in FIG. 5. In FIG. 5 unembossed film 1(a) is fed between steel roll "S" and rubber roll "R". Steel roller "S" will have on its surface an embossed configuration in accordance with the configuration of the final film shown in FIG. 2. Either one or both rollers are preferably cooled by circulating a cooling fluid through the hollow interior of the rollers.

Engraving of the steel roller is achieved by conventional means. The depth of the engraving will be substantially that depth or height which is ultimately desired for the depressions and protuberances on the film. Wind-up roller "W" rolls up the embossed film subsequent to the embossing. Rubber roller "R" has a hardness of about 50 durometers which allows for the steel embossing roller "S" to form the desired configuration on the film. If desired, a pair of metal rolls with matched engraving on their surfaces may be used to produce the embossed film of the present invention.

The operating conditions such as temperature and roller speed are easily determined by those skilled in the art.

The films of this invention, as before said, exhibit a high resistance to edge-roll and a low tendency towards reflecting light. In fact, films of this invention have a gloss of between about 3 and 15 which is quite low.

I claim:

1. An embossed length of thermoplastic polyolefin film having a pattern of latitudinally and longitudinally alternating, hollow protuberances and depressions on each side of said film wherein: (a) each of said protuberances and depressions have four substantially identical sidewalls, (b) each of said protuberances has a top wall, (c) each of said depressions has a bottom wall, (d) a first edge of each of said sidewalls of said protuberances is planarly connected to a bottom wall of a depression, and a second edge of each of said sidewalls opposite said first edge is connected to a top wall of a protuberance, (e) a third edge of each of said sidewalls, and a fourth edge of each sidewall opposite said third edge are each planarly connected to adjacent sidewalls, (f) the opposite side of each hollow protuberance forms one of the depressions on the film side opposite the protuberance, (g) said protuberances are substantially in the shape of four-sided, truncated pyramids, (h) said sidewalls of said protuberances and said depressions form an angle with the bottom wall of said depression from about 45° to about 85°, and (i) said protuberances have a height of from about 0.5 mils to about 10 mils.

2. The embossed thermoplastic film of claim 1 wherein said protuberances have a height of from about 1.5 mils to about 5.0 mils.

* * * * *